United States Patent
Kato

[11] 4,037,918
[45] July 26, 1977

[54] FOURIER-TRANSFORM HOLOGRAPHY BY PSEUDO-RANDOM PHASE SHIFTING

[75] Inventor: Makoto Kato, Osaka, Japan

[73] Assignee: Matsushita Electric Industrial Co., Ltd., Japan

[21] Appl. No.: 600,589

[22] Filed: July 31, 1975

[30] Foreign Application Priority Data

Aug. 3, 1974 Japan ............... 49-89248
Apr. 23, 1975 Japan ............... 50-49930
Apr. 23, 1975 Japan ............... 50-49931

[51] Int. Cl.² .................. G03H 1/16; G03H 1/32
[52] U.S. Cl. .................. 350/3.5; 350/162 SF
[58] Field of Search .......... 350/3.5, 162 SF, 314; 340/173 LT, 173 LM

[56] References Cited

U.S. PATENT DOCUMENTS

| | | | |
|---|---|---|---|
| 3,604,778 | 9/1971 | Burckhardt | 350/3.5 |
| 3,744,871 | 7/1973 | Takeda et al. | 350/3.5 |
| 3,829,193 | 8/1974 | Tsunoda et al. | 350/3.5 |
| 3,838,904 | 10/1974 | Takeda et al. | 350/3.5 |
| 3,917,380 | 11/1975 | Kato et al. | 350/3.5 |

*Primary Examiner*—Ronald J. Stern
*Attorney, Agent, or Firm*—Robert E. Burns; Emmanuel J. Lobato; Bruce L. Adams

[57] ABSTRACT

A phase mask comprised of a rectangular array of phase shifting areas arranged in a pseudo-random pattern is illuminated with a beam of electromagnetic radiation. The array of pseudo-randomly phase shifted beams is focused on a Fourier transform plane on which the power spectrum of the beams distributes in two orthogonal directions from its center maxima. The phase shifting areas are arranged in such a manner that there is an approximately equal number of phase shifts for each of the different phase shifting areas with a constant phase relation between orthogonally adjacent phase shifting areas. The center maxima of the spectrum is confined to a rectangular-shaped area and uniformly distributed by suitably selecting the number of different phase shifts. Coherent noise on the reconstructed image is effectively eliminated.

23 Claims, 21 Drawing Figures

Fig. 3

| π | 3π/2 | 0 | 3π/2 |
| 3π/2 | 0 | π/2 | 0 |
| 0 | π/2 | π | π/2 |
| 3π/2 | 0 | π/2 | 0 |

Fig. 4

| π | 3π/2 | 0 | 3π/2 |
| 3π/2 | 0 | π/2 | 0 |
| 0 | π/2 | π | π/2 |
| 3π/2 | 0 | π/2 | 0 |

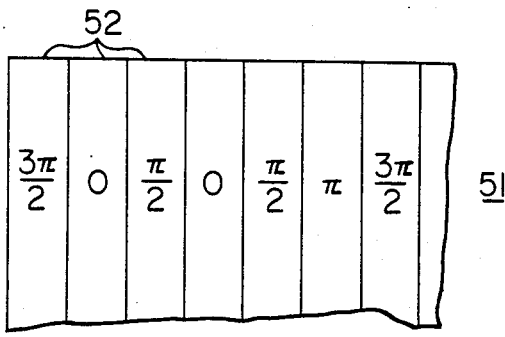
Fig. 6a
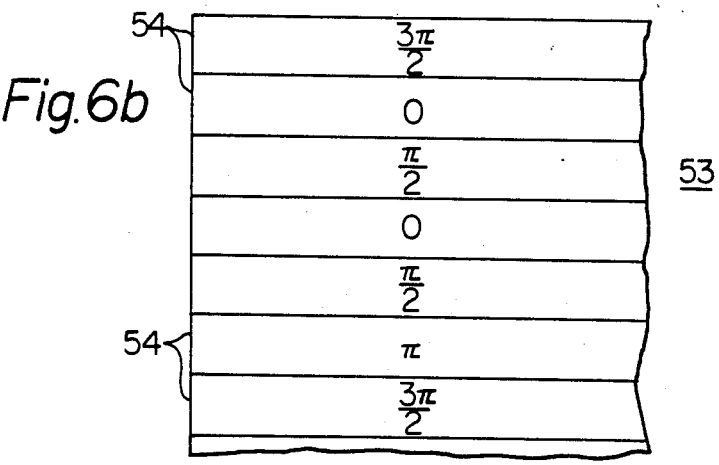
Fig. 6b
Fig. 6c

Fig. 9a
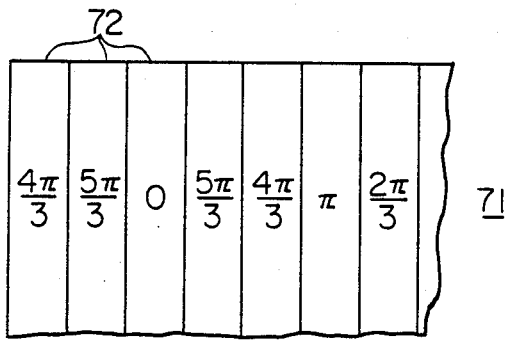
Fig. 9b
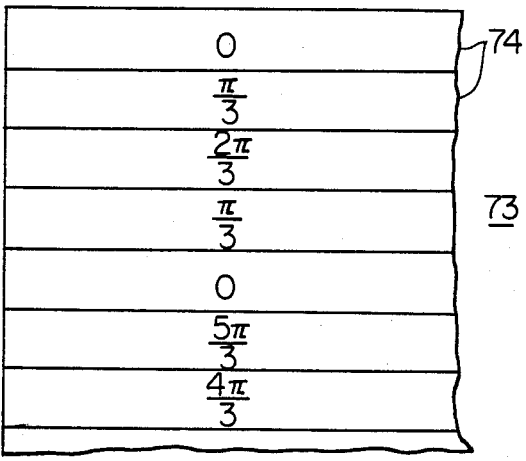
Fig. 9c

FOURIER-TRANSFORM HOLOGRAPHY BY PSEUDO-RANDOM PHASE SHIFTING

The present invention relates generally to Fourier transform recording and in particular to the recording of the Fourier transform of an array of beams of electromagnetic radiation using a phase shifting mask and more particularly to the arrangement of phase shifting areas on the phase mask in a pseudo-random pattern.

In a system for recording a Fourier-transform hologram, it is desirable to make the system relatively insensitive to blemishes or dust on the hologram-recording medium so that a small blemish or dust particle on the hologram memory cannot obscure the reconstructed image or change a bit of digital data.

The use of random phase mask is disclosed in U.S. Pat. No. 3,604,778 issued to Burckhardt. In the prior art phase mask phase shifts of 0° and 180° are randomly interspersed in a pattern of a square array to randomly shift the phase of an incident beam. However, in the Fourier-transform recording of high-density digital data or a continuous tone image, the use of the random phase mask of two shift levels creates an objectionable fringe pattern on the reconstructed image because interference occurs between phase shifting squares which adjoin each other with a phase difference of 180°. The use of a random pattern of four levels of phase shift (0°, 90°, 180°, 270°) may be a possible solution to the reduction of such coherent noise, there is also the probability of a phase difference of 180° occurring between orthogonally adjoining phase-shifting areas.

Conventionally, the random phase mask is illuminated with an array of beams formed by an array of circular holes to shift the phase of the passing beams randomly. The phase-shifted beams are focused on the Fourier transform plane where the center maxima or Airy disk of the power spectrum of the beams distributes within an area of a finite size. An analysis shows that if the beams are focused through a circular aperture placed immediately in front of the Fourier transform plane, e.g. at the hologram plane and the radius of the aperture is brought substantially equal to the radius of the Airy disk, the intensity of the reconstructed sampling pattern fluctuates randomly. This is partly because the sampled beams are randomly phase-shifted and partly because the spatial frequency spectrum of the phase mask is limited by the circular aperture so that the image areas of the sampled beams become broader and interfere with each other. The diffraction pattern of each sampled beam extends in its image plane to the first-order waves and to further high-order waves with decreasing intensity where it interferes with the adjacent diffracted waves. The randomness of the phase difference between adjacent wave fronts gives rise to random intensity fluctuation, which may result in coherent noise.

Therefore, the primary object of the invention is to provide apparatus for recording a Fourier transform hologram which is free from coherent noise.

Another object of the invention is to provide a novel phase-shifting mask in which phase-shifting areas are arranged in a pseudo-random pattern.

A further object of the invention is to provide a pseudo-random phase mask in which the phase-shifting areas have a constant phase difference between orthogonally adjacent areas, so that power spectrum distributes in two orthogonal directions from its center maxima.

Still another object of the invention is to provide a pseudo-random phase mask in which the phase-shifting areas are arranged such that the distribution of the power spectrum of the phase-shifting beams is confined to a minimum area.

Still another object of the invention is to provide a light diffuser in which the pseudo-random phase mask is aligned with a sampling mask having an array of square apertures having one-to-one correspondence with the phase shifting areas of the phase mask to provide orthogonal distribution of the power spectrum on the Fourier transform plane.

Briefly described, in a recording system of a Fourier transform hologram, the pseudo-random mask of the invention is illuminated with a square array of sampled beams to shift the beams in a pseudo random pattern. The phase mask has at least three levels of phase shifts of approximately equal numbers arranged in a constant phase relationship between orthogonally adjacent phase shifts, while the direction of change of a phase shift from one location to another in a two-dimensional phase sequence is at random with equal probability over the entire area of the phase mask.

According to one aspect of the invention, the pseudo-random arrangement of phase shifting areas can be achieved by alignment of a conventional random pattern of 0° and 180° phase shifts with a regular pattern of 0° and 90° phase shifts in a one-to-one correspondence therewith to give a four-level pseudo-random phase mask.

In accordance with another aspect of the invention, the pseudo-random pattern can be obtained by arranging discrete phase shifts in a one-dimensional sequence with a constant phase difference between adjacent phase shifts, while the direction of change in phase shift from one location to another is at random with equal probability of occurrence. The difference in phase between adjacent phase shifts can be made small to smooth out the cross-section of phase steps by inserting median values between adjacent phase shifts. Two phase masks are provided, each of which comprises a succession of stripes of phase shifts designated in the same order of sequence as the aforementioned phase sequence. These two masks are overlayed one upon the other so that their stripes intersect perpendicularly each other. The light incident thereon undergoes a two-dimensional phase shift by discrete amounts equal to the summation of the phase shifts on the corresponding portion of the two masks.

These and other objects, features and advantages of the present invention will be understood from the following description taken in conjunction with the accompanying drawings, in which:

FIG. 3 is an enlarged view of part of the phase mask of the invention;

FIG. 4 is an enlarged partial view of the relationship between the sampling mask and the phase mask used in the apparatus of FIG. 1;

FIGS. 5a to 5c are partial views showing a first preferred embodiment of the invention;

FIGS. 6a to 6c are partial views showing an alternative embodiment of the phase mask of FIG. 5;

FIGS. 7 to 9 are partial views showing another embodiment of the invention;

Figure 1:
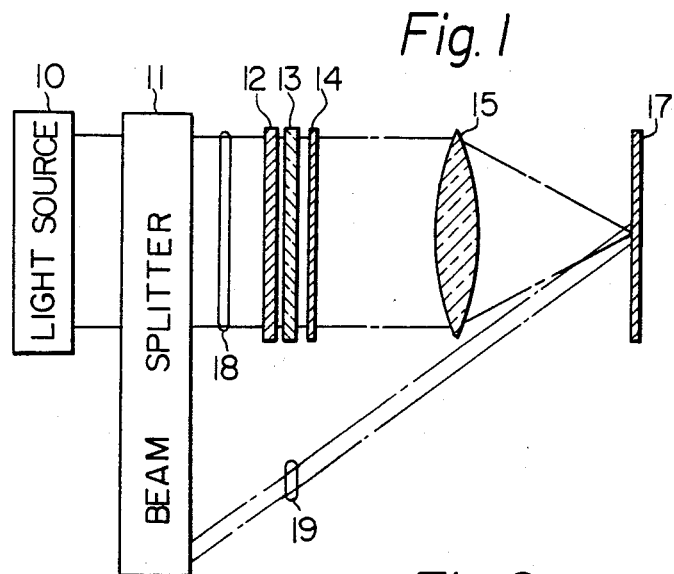
FIG. 1 is an exemplary arrangement for recording a Fourier transform hologram with a pseudo-random phase mask of the invention.

Referring now to FIG. 1 apparatus used in the practice of the present invention is shown and comprises a light source 10, a beam splitter 11, a sampling mask 12 that is comprised of an opaque medium in which there are small square or rectangular transparent areas or apertures, a random phase mask 13, an object transparency 14, a Fourier transform lens 15 located substantially at a focal distance away from sampling mask 12, and a photosensitive recording medium 17 that is located in the rear focal plane, which is also called the Fourier transform plane, or lens 14. The light source 10 may be a conventional laser. The beam splitter 11 splits the light from source 10 into an illuminating beam 18 and a reference beam 19 each having a constant phase relationship relative to the other and directs these two beams onto the same portion of recording medium 17 at an angle with respect to each other. Consequently, when the apparatus of FIG. 1 is operated, an interference pattern is formed on a particular portion of recording medium 17.

Figure 2:
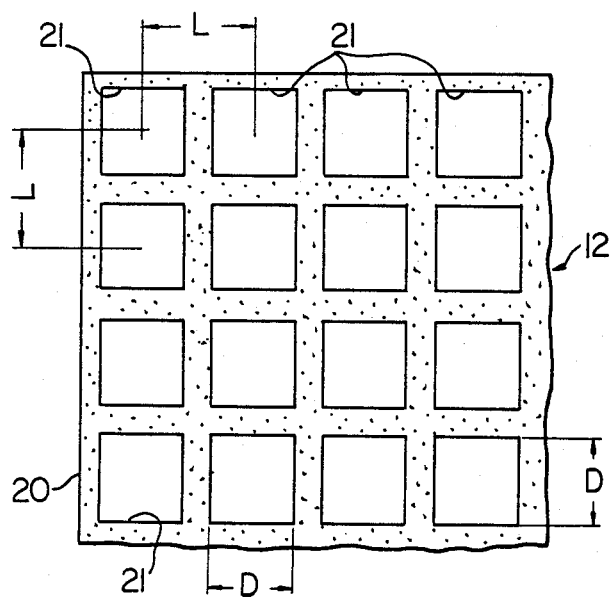
FIG. 2 is a partly enlarged view of a sampling mask used with the arrangement of FIG. 1.

As shown in FIG. 2, the sampling mask 12 bears an array of square apertures 21 on an otherwise opaque medium 20. These apertures are arranged in a pattern of rows and columns so that adjacent apertures are equidistant, their centers being separated by a distance L and their edges having a length D. The mask 12 receives a parallel beam of light and provides an array of sampled beams of light on its output side.

As shown in FIG. 3, the pseudo random phase mask 13 is comprised of an array of transparent squares 22, the edges of which have a length L that is the same as the spacing between the centers of the equidistant square apertures 21 of mask 12. As indicated by the designation $\pi(=180°)$ in some of the squares 22 of phase mask 13, some of the squares shift the phase of the light transmitted through them by $\pi$ radian with respect to the phase of the light that passes through the squares designated 0. Likewise, the squares labelled $3\pi/2(=270°)$ and $\pi/2(=90°)$ in some other squares in the phase mask impart phase shifts of $3\pi/2$ and $\pi/2$ radians, respectively, with respect to the light that passes through the 0 radian squares. As will be described in detail, there is an approximately equal number of phase shifting squares for each of the different sets of phase shift and these squares are distributed randomly but with a predetermined amount of phase difference, $\pi/2$ in this example, between orthogonally adjoining squares.

In the apparatus of FIG. 1 sampling mask 12 and phase mask 13 are aligned so that light from each square aperture 21 of sampling mask 12 passes through only one square 22 of phase mask 13, so that there is a one-to-one correspondence between the apertures of sampling mask 12 and the phase-shifting areas of phase mask 13.

The combination of the two masks is shown in FIG. 4. One-fourth of the sampled beams from sampling mask 12 is phase shifted by $\pi/2$ radian by the particular squares 22 of phase mask 13, another one-fourth undergoes a phase shift of $\pi$ radian, and another one-fourth undergoes a phase shift of $3\pi/2$ radian and the remaining one-fourth of the beams will have a zero phase shift.

The sampled, phase-shifted beams of light then pass the object transparency 14 which bears a continuous tone image thereon, so that the beams are intensity modulated thereby in accordance with the image density thereof as they pass therethrough.

Figure 10:
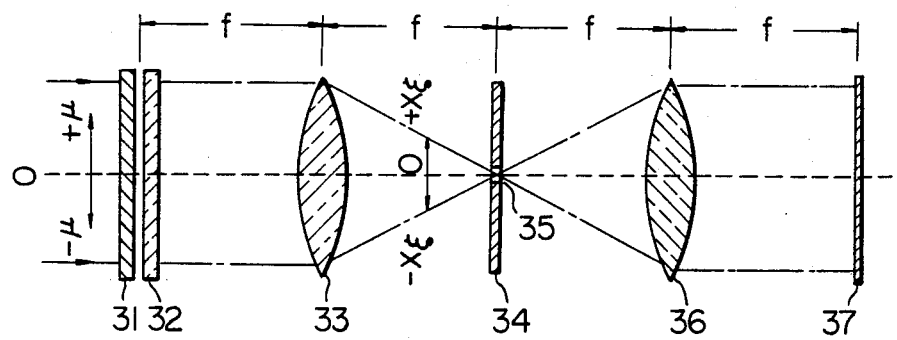
FIG. 10 shows an arrangement used for analysis of the invention.
Figure 11:
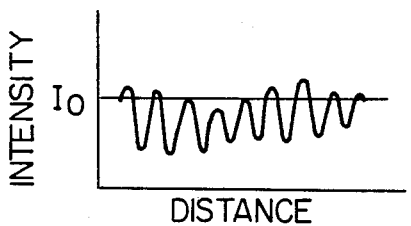
FIG. 11 shows an intensity distribution of the sampling pattern obtained by the arrangement of FIG. 10.

The effect of pseudo-random phase shifting through an array of square apertures was observed by the apparatus of FIG. 10, in which lenses 33 and 36 are provided in spaced-apart, coaxial relationship with an aperture mask 34 having an aperture 35 located at a focal point of lenses 33 and 36 which is also the Fourier transform plane of lens 33. A phase mask 32 is positioned at a focal length of lens 33 adjacent to which a sampling mask 31 is located remote from lens 33. A recording medium 37 is located at a focal length of lens 36, as illustrated. This arrangement is useful for analyzing the intensity distribution of a reconstructed image. A beam of parallel light is made incident on the sampling mask 31 and sampled thereby and phase-shifted by phase mask 32 and focused by the Fourier transform lens 33 onto the focal point or the Fourier transform plane 34. Because of the diffraction of light by the edges of square apertures in the sampling mask 31, the power spectrum of the beams distributes in two orthogonal directions from the center maxima or zero-order wavefronts as evidenced by a photograph taken across the plane 34 (FIG. 10) as will be described later. Since it is known that the radius of the Airy disc is inversely proportional to the radius of the diffraction hole, the area of the center maximum is also inversely proportional to the area of the sampling square aperture. It was shown that when the length D of edges of square apertures is made equal to the center-to-center spacing L (therefore the sampling mask substantially disappears), the center maxima was confined to 1.4 mm². With no use of the sampling mask, the square-shaped phase shifting areas also provide orthogonal distribution of the power spectrum because the beams as they pass through the phase mask are diffracted by the fringes of phase shifting squares in two orthogonal directions.

A phase mask can thus be fabricated in consideration of the orthogonal distribution of the power spectrum such that the orthogonally adjacent phase shifting squares have a constant phase relationship to each other, regardless of what phase difference may exist between diagonally adjacent phase-shifting squares.

To record a Fourier transform hologram of the sampled, phase shifted beams on a particular portion of recording medium 17, coherent light is directed from source 10 to beam splitter 11 where it is deflected and formed into the illuminating beam 18 and the reference beam 19. Illuminating beam 18, which is a beam of parallel light is directed onto the Fourier transforming lens 15 through sampling mask 12, phase mask 13 and object transparency 14. The lens 15 focuses the beam onto the desired portion of recording medium 17 located in the rear focal plane, or Fourier transform plane, of lens 15. Consequently, an array of information bearing light beams 20 is formed representative of the image density of the object transparency 14. Simultaneously, reference beam 19 is directed onto the same portion of recording medium 17, and because beams 18 and 19 are coherent and have a constant phase relationship, the two beams form an interference pattern that is recorded as a Fourier transform hologram on medium 17. If each hologram is recorded on only a small area of medium 17, it may be preferable to use a mask to define the area of recording medium 17 to record an image corresponding to the center maximum of the power spectrum. It is apparent that the Fourier transforming lens 15 may be located in front of the sampling mask 12 to illuminate it with a converging beam of light so far as the recording medium 17 is located in the Fourier transform plane of lens 15. In addition, there are alternative ways of arranging the phase mask with the sampling mask because it is only necessary that the phase mask be positioned so that the phase of incident beams can be shifted a constant amount. For example, the phase mask couled be positioned immediately in front of the sampling mask instead of behind the sampling mask as shown in FIG. 1.

Figures 5A, 5B, 5C:
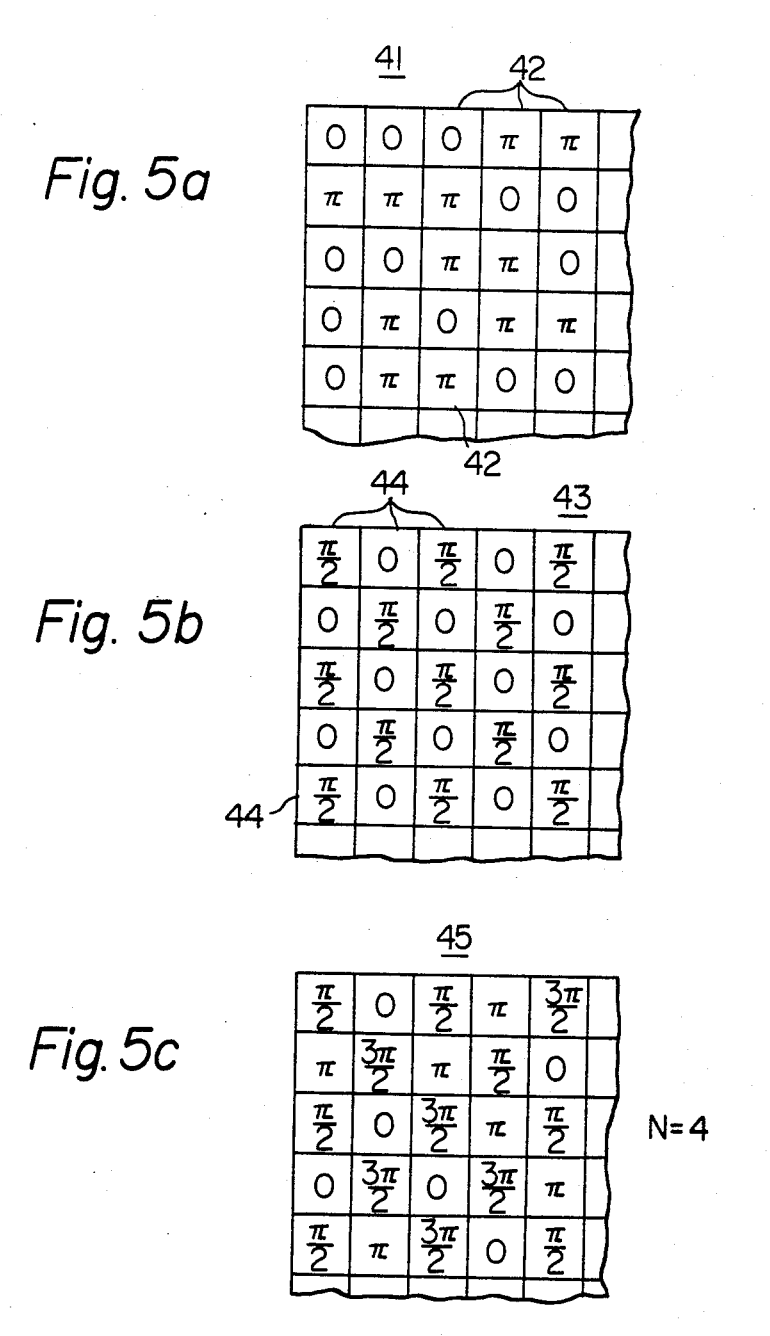

The fabrication of a first example of such a phase mask is explained with reference to FIGS. 5a and 5c. In FIG. 5a a random phase mask 41 is comprised of a random array of phase shifting squares 42. Approximately one-half of the squares is fabricated to shift the phase of incident light by $\pi$ radian or 180° and these squares are distributed randomly throughout the phase mask 41. Another phase mask 43 is shown in FIG. 5b and comprised of a regular array of phase shifting squares 44. Fifty percent of the squares is fabricated to shift the phase of incident light by $\pi/2$ radian and arranged in an orderly manner along each row and column so that the $\pi/2$ radian phase shift occurs alternately with the zero degree shift along the rows and columns. The two phase masks are overlapped so that the squares of each phase mask have a one-to-one correspondence with the squares of the other. This results in phase shifts in which phase shifts of the corresponding squares add up to give a phase mask 45 as shown in FIG. 5. FIG. 5c shows that phase difference between orthogonally adjacent squares is $\pi/2$ radian and there are four different phase shifts (0, $\pi/2$, $\pi$ and $3\pi/2$) of approximately equal number arranged in a pseudo-random fashion throughout the mask 45, since different phase shifts occur at random along each row and column but occur regularly with respect to the orthogonally adjacent squares such that a constant phase difference exists therebetween. The random phase mask 41 was fabricated with the aid of a random number generator which formed a pattern of approximately equal numbers of opaque and transparent squares randomly interspersed. This pattern was reduced photographically to the scale of the phase mask and was used to etch glass in a well known manner. The regular phase mask 42 was fabricated with a regular pattern of equal number of opaque and transparent squares alternately interspersed, and was fabricated in the same manner as phase mask 41.

An alternative embodiment of the pseudo-random phase mask having a pseudo-random phase sequence of four levels (0, $\pi/2$, $\pi$ and $(3/2)\pi$) is shown in FIG. 6c. A phase mask 51 comprised of a succession of phase-shifting stripes 52 is shown in FIG. 6a. The phase-shifting stripes are arranged such that they have a phase difference of $\pi/2$ radian between adjacent phase-shifting stripes. In a similar manner, another phase mask 53 (FIG. 6b) is comprised of a succession of phase-shifting stripes 54 bearing the same order of phase sequence as in mask 51, the direction of stripes 54 being normal to the direction of stripes 52 of mask 51. As indicated above, these masks may be prepared by etching a glass substrate to depths which equal to one of the multiples of $\lambda/4(k-1)$ where $\lambda$ is the wavelength of incident light, and k, the refraction coefficient of the substrate. The phase masks 51 and 52 were overlapped together so that a square array of phase-shifting squares 56 resulted in a phase mask 55 shown in FIG. 6c. Each of the squares 56 bears a phase shift which is the sum of phase shifts on the corresponding portion of the intersecting stripes 52 and 54. It will be noted that each of the phase-shifting areas on the mask 55 has a phase difference of $\pi/2$ radian with respect to the orthogonally adjacent squares. In FIGS. 6a and 6b, the one-dimensional series of phase shifts randomly varies by the amount of $+\pi/2$ or $-\pi/2$ in the order of occurrence as one sees it from left to right or vice versa and the probability of the occurrence of positive and negative signs (or increment and decrement of phase shift) is approximately ½. The 50 percent probability of the occurrence of the positive and negative signs can be obtained by the use of two-valued random numbers generated by a random number generator. It is understood that a pair of one-dimensional pseudo-random phase sequences can be converted into a two-dimensional array of pseudo-random phase shifts by the two-dimensional summation of intersecting phase shifts.

Figure 13:
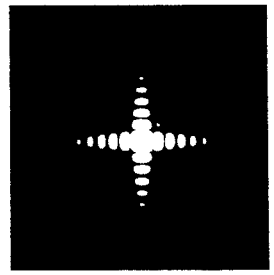
FIG. 13 is a photograph taken by the arrangement of FIG. 10.

Phase mask 55 was then aligned with the sampling mask 12 of FIG. 2 so that the phase shifting squares 56 are in registry with the transparent squares 21 of sampling mask 12. Thus, they looked like the one shown in FIG. 4 which illustrates the top-left corner of the combination of sampling and phase masks 12 and 55. Such combination is advantageously termed a light diffuser because it is capable of diffusing the wavefront or phase of the incident beam to provide uniform distribution of zero-order diffracted wavefronts. The light diffuser was placed in the front focal plane of the Fourier-transform lens 33 and a photosensitive medium was placed on the rear focal plane, or Fourier transform plane 34, of lens 33. The light diffuser was illuminated with a beam of collimated coherent light. The power spectrum or intensity distribution of the diffused light was recorded as shown in FIG. 13. The power spectrum clearly distributes in two orthogonal directions from the center maxima.

As indicated above, the important characteristic of the invention resides in the use of square or rectangular phase shifting areas arranged in a pattern of rows and columns and if the sampling mask will be used in conjunction therewith, the sampling apertures must also be square or rectangular instead of circular holes so that an orthogonally distributing power spectrum can result. It is to be noted that the sampling mask may be dispensed with if the center maxima is to be confined to an area of a minimum size determined by the center-to-center spacing of the phase shifting squares. Since the absolute value of phase difference between adjacent phase shifting squares 56 is kept at a constant value and undesirable interference only occurs between the sampled beams spaced apart by more than one sampling point or square, the present embodiment permits a high-density record of Fourier transform hologram approximately four times the density attainable with the conventional random phase shift of 0 and $\pi$ radians. In addition, a computer simulation was conducted using the apparatus of FIG. 10 with the following data:

Focal length (f) of lenses 33 and 36 . . . 70 mm

Center-to-center spaceing (L) of sampling mask 12 . . . 50 μ

Length (D) of edges of square apertures . . . 34 μ

The simulation indicated that the center maxima of power spectrum on the Fourier transform plane 34 was confined to an area of approximately 4 mm². The lens 36 formed an image of the sampled beams on the plane 37. Signal-to-noise ratio (=20 log ($I_o/\Delta I$)) was computed by the simulation and showed that signal-to-noise ratio obtained by the pseudo-random phase mask with four shift levels was approximately 45 dB which is favorably compared with a ratio of approximately 32 dB obtained by the conventional random phase mask, where $I_o$ is the average intensity and $\Delta I$, the standard deviation of intensity fluctuations. If the same signal-to-noise ratio is desired with the random phase mask of two phase shift levels, the center maxima and hence the hologram size will necessarily become 16 mm², four times that of the present embodiment.

Figure 7:
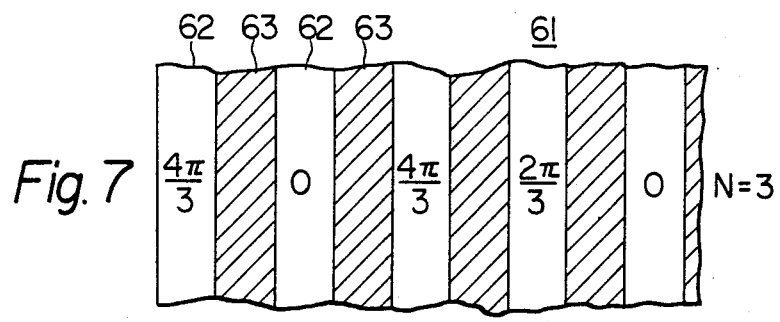
Figure 8:
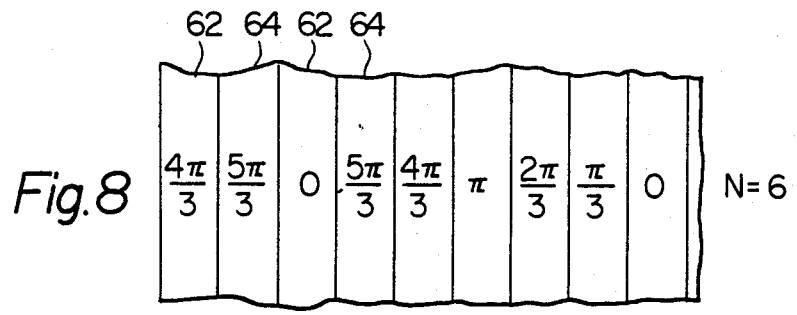

A third embodiment of the invention is shown in FIGS. 7 to 9. In FIG. 7, a part of a phase mask 61 is shown carrying one-dimensionally arranged phase shifting stripes 62 which alternate with non-phase shifting stripes or zero-degree stripes 63, the number of phase shifts being 3. Approximately one-third of the stripes gives a phase shift of $2\pi/3$, another one-third gives a shift of $4\pi/3$ and the remaining portion gives a zero-radian shift. As described above, these phase shifting stripes 62 were generated by a random number generator such that the phase difference between adjacent areas is $+2\pi/3$ or $-2\pi/3$, the probability of occurrence of either sign being approximately ½. The stripes 63 are filled with phase shifting stripes 64 representing the mean value of the phase shifts of adjacent stripes as shown in FIG. 8. This can result in a smooth shift of phase change from one stripe to another so that the total number of phase shifts is equivalently 6. Although it may appear that the use of six random numbers may give the same result, a more smooth shift of phase from one area to another was obtained in the present embodiment than is available with the use of six random numbers. The phase sequence obtained by the insertion of arithmetical median values of phase shift is therefore a phase sequence differing from that which would be obtained by operating the random number generator with six random numbers.

Figure 14:
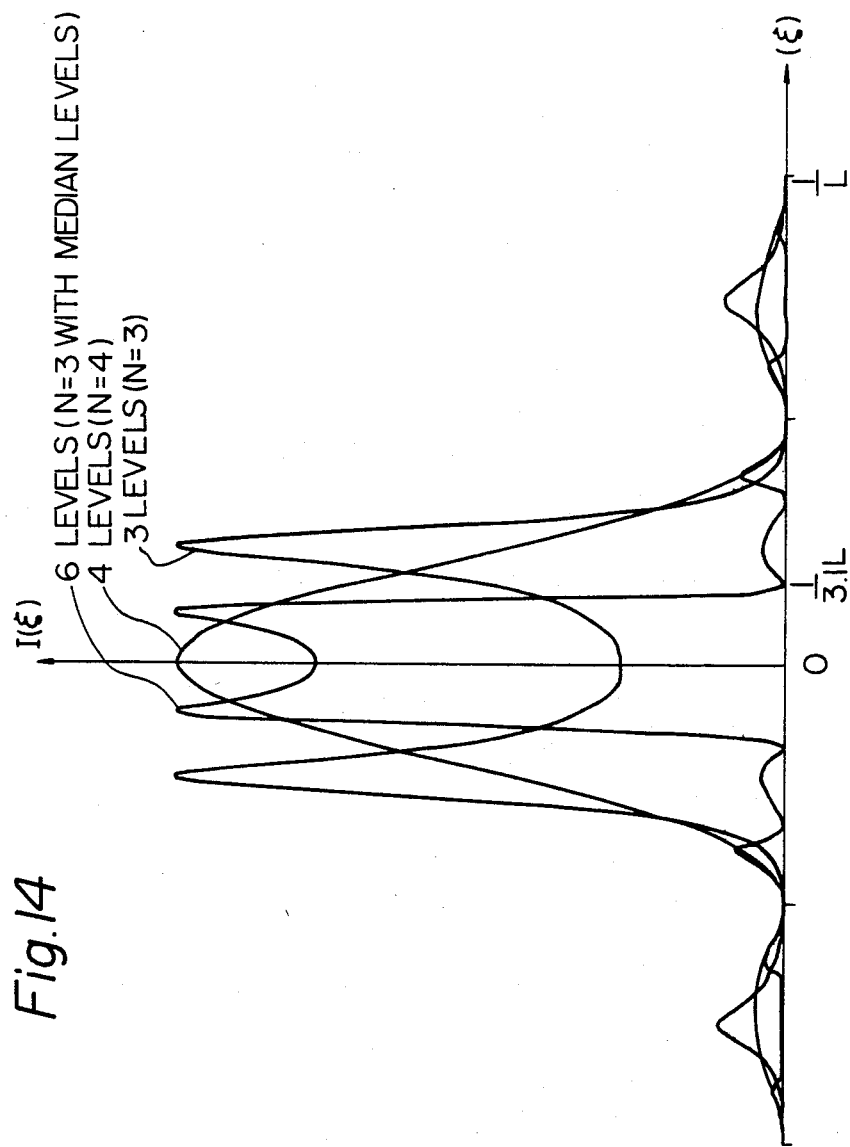
FIG. 14 shows power spectrum distributions of the embodiments of the invention.

FIG. 9a shows a phase mask 71 which is comprised of a series of phase shifting stripes 72 similar to those of FIG. 8. A different set of phase shifts 74 may be arranged on a phase mask 73 as shown in FIG. 9b but arranged on the same principle as described above. These two masks were disposed in an overlying relationship to each other which results in a square array of phase shifts as shown in FIG. 9c. The normalized power spectrum distribution was obtained for each of the pseudo-random phase masks having three, four and six phase shifting levels as shown in FIG. 14. The center maxima of the power spectrum obtained for the six-level phase shift is confined to an area defined by the distance $\pm \lambda f/3.1L$ from the center axis, where L is the center-to-center spacing between adjacent sampling areas 21 in sampling mask 12 as referred to above, where $\lambda$ is the wavelength and $f$, the focal length of Fourier transform lens 33. The effective aperture of a hologram obtained for the six-level pseudo-random phase shifting can be reduced to substantially one-third of the effective aperture of a hologram obtained with the conventional two level random phase shifting.

Figure 15:
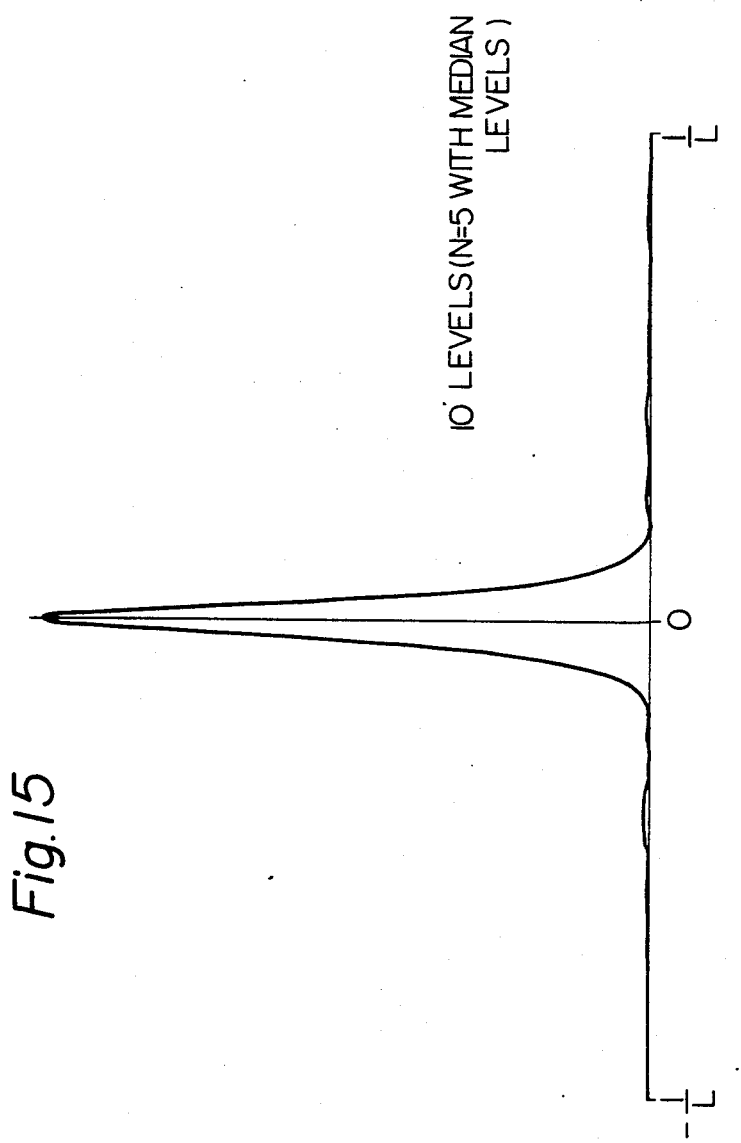
FIG. 15 shows a power spectrum distribution of a 10-level pseudo-random phase mask.

Another pseudo-random phase mask is prepared in the same manner as described above by arranging a series of phase shifting areas including 0, $2\pi/5$, $4\pi/5$, $6\pi/5$, and $8\pi/5$ and inserting median values between adjacent areas, that is $\pi/5$ between 0 and $2\pi/5$ areas, $3\pi/5$ between $2\pi/5$ and $4\pi/5$ areas, and so forth. The power spectrum distribution was plotted as shown in FIG. 15.

The previously described phase mask can be fabricated by the use of etching technique. The etching technique can be used to fabricate one-dimensional phase sequences or stripes such as shown in FIGS. 6a and 6b on separate glass plates and the glass plates are overlapped one upon the other such that the stripes of the two plates intersect at right angles to each other, thereby resulting in a two-dimensional phase shifting array, (FIG. 6c). An alternative method involves etching a first striped array of phase sequence on a single glass substrate and then etching a second phase array on the same substrate such that the stripes of the substrates intersect at right angles to each other. In a further modified method, the random numbers are arranged on a two-dimensional array and a single glass substrate is etched on one surface thereof in accordance with the two-dimensional phase array.

It will be noted that the substantial portion of the power spectrum, or center maxima can be confined to a smaller area with increase in the number of phase shifting levels on a pseudo-random phase mask. However, from the signal-to-noise ratio standpoint it was found that an optimum hologram size was obtained for the six-level pseudo-random phase mask which is prepared by arranging median values between adjacent phase shifting areas in a three-phase random pattern discussed above. In some applications where high information density is of primary concern and the signal-to-noise ratio can be tolerated to some degree, the preferred number of phase shifting levels is six.

Figure 12:
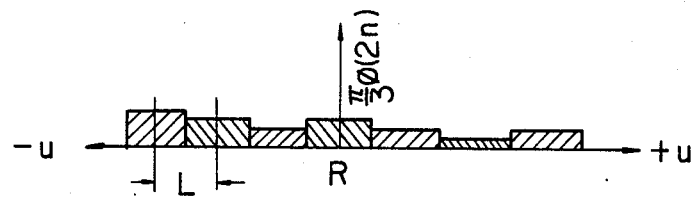
FIG. 12 shows a one-dimensional mathematical model of a phase sequence.

The mathematical formula of the amplitude distribution of a six-level phase shift can be obtained by analyzing a one-dimensional model of the six-level pseudo-random phase sequence. The cross-section of the phase sequence is shown in FIG. 12, which is represented by a rectangular shaped function rect under the following conditions:

$$\frac{\pi}{3} | \phi(2n) - \phi(2n - 2) | = \frac{2\pi}{3} \\ \frac{\pi}{3} | \phi(2n) - \phi(2n - 1) | = \frac{\pi}{3} \\ \frac{\pi}{3} | \phi(2n) - \phi(2n + 1) | = \frac{\pi}{3} \quad \bigg\} \quad (1)$$

where $\phi(2n)\pi/3$ is the phase shift of an even-numbered phase-shifting area and $\phi(2n + 1)\pi/3$, the phase shift of an odd-numbered phase shifting area. The amplitude transmittance of the phase mask g(u) is given by the following equation:

$$g(u) = \sum_{n=-K}^{k} \bigg[ \text{rect}(\frac{u - 2nL}{L}) \exp\bigg\{ j\frac{\pi}{3} \phi(2n) \bigg\} + \text{rect}(\frac{u - 2nL - L}{L}) \exp\bigg\{ j\frac{\pi}{3} \phi(2n - 1) \bigg\} \bigg] \quad (2)$$

where, $u$ represents the distance from a reference point $R$; $n$, the location of phase shifts from the reference point; $L$, the center-to-center spacing between phase shifts.

Autocorrelation of the power spectrum distribution is obtained by the following equation:

$$A(x) = \int_{-\infty}^{\infty} g(u)g^*(u-x)dx \quad (3)$$

where x is the distance from a given phase shifting area. The envelope of the power spectrum of the six-level pseudo-random phase sequence is expressed by:

$$I(\xi) = \text{Four}[A(x)], \alpha L^2\{\sin^2(\pi L\xi)/(\pi L\xi)^2\} (1 + \cos 2\pi L\xi) + \quad (4)$$

where the spatial frequency $\xi$ is represented by $x\xi/\lambda f$ where $x\xi$ is the real coordinate in the hologram.

In FIG. 14, power spectrums are plotted for phase shift levels 3, 4 and 6. Since the residual terms of equation (4) cancel each other and the curve of the four-level phase shift is mathematically represented by the following function:

$$L^2\sin^2(\pi L\xi)/(\pi L\xi)^2 \quad (5)$$

the power spectrum of a six-level phase shift is approximately the sum of the power spectrum of a four-level phase shift and the product of the two spectrums.

From the foregoing description, it follows that the pseudo-random phase mask is comprised of a square or rectangular phase shifting areas arranged in a pattern of rows and columns such that there is an approximately equal number of phase shifting areas for each of the different phase shifting areas, wherein the number of different phase shifting areas is N which is greater than three inclusive and each of the different phase shifting areas is one of the multiples of $m2\pi/N(=360°/N)$, where $m$ ranges from 1 to $N$, and the phase difference between orthogonally adjacent phase shifting areas is $2\pi/N$ radian $(=360°/N)$.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. Apparatus for forming a hologram of an array of beams of electromagnetic radiation on a Fourier transform plane, comprising:
   a pseudo-random phase mask receptive in use of a beam of electromagnetic radiation and comprised of phase shifting areas arranged in a pattern of rows and columns, there being an approximately equal number of phase shifting areas for each of the different phase shifts, wherein the number of different phase shifts is N which is at least three and each of the different phase shifts is one of the multiples of $m360°/N$, where $m$ ranges from 1 to N, and the phase difference between orthogonally adjacent phase shifting areas is $360°/N$, whereby the power spectrum of said phase-shifted beam on the Fourier transform plane distributes in two orthogonal directions from the center maximum of the power spectrum; and
   means for recording a hologram of the Fourier transform of said beam at said center maximum.

2. Apparatus as claimed in claim 1, further comprising an aperture mask having an array of rectangular apertures in one-to-one correspondence with the phase shifting areas of said phase mask.

3. Apparatus as claimed in claim 1, wherein said phase mask comprises first and second arrays of phase shifting stripes which intersect at right angles to each other, and wherein in each of the arrays there is an approximately equal number of phase shifting stripes for each of the different phase shifts, wherein the number of different phase shifts is N which is at least three and each of the different phase shifts is one of the multiples of $m360°/N$, where $m$ ranges from 1 to N, and the phase difference between adjacent phase shifting stripes is $360°/N$.

4. Apparatus as claimed in claim 3, wherein said first and second phase shifting arrays are provided on a single light transmissive substrate.

5. Apparatus as claimed in claim 3, wherein said first and second phase shifting arrays are provided on separate light transmissive substrates.

6. Apparatus as claimed in claim 1, additionally comprising an object transparency disposed in the path of said phase-shifted beam to intensity-modulate the same.

7. Apparatus as claimed in claim 1, wherein said phase mask comprises:
   a first radiation transmissive substrate comprised of a random array of an approximately equal number of zero and 180° phase-shifting areas; and
   a second radiation transmissive substrate disposed on said first substrate and comprised of a regular array of an equal number of two phase-shifting areas each having a phase difference of 90° with respect to said zero and 180° pase-shifting areas and arranged in a one-to-one correspondence with said areas.

8. Apparatus as claimed in claim 1, wherein said phase shifts include 0°, 90°, 180° and 270°.

9. A pseudo-random phase mask for use in recording a Fourier transform hologram, comprising: a light transmissive substrate comprised of an array of phase shifting areas, there being an approximately equal number of phase-shifting areas for each of the different phase shifts, wherein the number of different phase shifts is N which is at least three and each of the different phase shifts is one of the multiples of $m360°/N$, where m ranges from 1 to N, and the phase difference between orthogonally adjacent phase shifting areas is $360°/N$.

10. A pseudo-random phase mask as claimed in claim 9, wherein said phase shifts include 0°, 90°, 180° and 270°.

11. A pseudo-random phase mask comprising, a pair of first and second light transmissive substrates in overlapping relationship, each said substrate comprised of a striped array of phase shifting areas, there being an approximately equal number of phase shifting areas for each of the different phase shifts, wherein the number of different phase shifts is N which is at least three and each of the different phase shifts is one of the multiples of $m360°/N$, where $m$ ranges from 1 to N, and the phase difference between adjacent phase shifting areas is $360°/N$, said first and second substrates being overlapped such that the stripes of said arrays intersect perpendicularly to each other.

12. A pseudo-random phase mask as claimed in claim 11, wherein said phase shifts include 0°, 60°, 120°, 180°, 240° and 300°.

13. A pseudo-random phase mask comprising, a first light transmissive substrate comprised of a random square array of an approximately equal number of zero and 180° phase shifting areas and a second light transmissive substrate disposed on said first substrate and comprised of a regular square array of an equal number of two phase shifting areas each having a phase difference of 90° with respect to said zero and 180° phase-shifting areas and arranged in a one-to-one correspondence with the areas of said first substrate.

14. A light diffuser for use in recording a Fourier transform hologram, comprising:
   an aperture mask having rectangular apertures arranged in a pattern of rows and columns; and
   a pseudo-random phase mask comprised of an array of phase shifting areas that have a one-to-one correspondence with the array of said rectangular apertures, there being an approximately equal number of phase shifting areas for each of the different phase shifts, wherein the number of different phase shifts is N which is at least three and each of the different phase shifts is one of the multiples of $m360°/N$, where $m$ ranges from 1 to N, and the phase difference between orthogonally adjacent phase shifting areas is $360°/N$.

15. A light diffuser as claimed in claim 14, wherein said phase mask comprises a pair of first and second light transmissive substrates in overlapping relation, each said substrate comprised of a striped array of phase-shifting areas, there being an approximately equal number of phase shifting areas for each of the different phase shifts, wherein the number of different phase shifts is N which is at least three and each of the different phase shifts is one of the multiples of $m360°/N$, where m ranges from 1 to N, and the phase difference between adjacent phase shifting areas is $360°/N$, said first and second substrates being overlapped such that the stripes of said arrays intersect perpendicularly to each other.

16. A method of making an array of phase shifts in a pseudo-random pattern, comprising:
   providing a first array of phase shifts by arranging different sets of phase shifting stripes in succession, such that there is an approximately equal number of phase shifting stripes for each of the different phase shifts, wherein the number of different phase shifts is N which is at least three and each of the different phase shifts is one of the multiples of $m360°/N$ where m ranges from 1 to N, and the phase difference between adjacent phase shifting stripes is $360°/N$;
   providing a second array of phase shifts by arranging different sets of phase shifting stripes in succession such that there is an approximately equal number of phase shifting stripes for each of the different phase shifts, wherein the number of different phase shifts is N which is at least three and each of the different phase shifts is one of the multiples of $m360°/N$ where m ranges from 1 to N, and the phase difference between adjacent phase shifting stripes is $360°/N$; and
   overlying said first and second arrays of phase shifting stripes one upon the other such that the phase shifting stripes of the first and second arrays are at right angles to each other.

17. A method of making an array of phase shifts in a pseudo-random pattern, comprising:
   etching the major surface of a light transmissive substrate to different depths to form different sets of phase shifting stripes in succession such that there is an approximately equal number of phase shifting stripes for each of the different phase shifts, wherein the number of different phase shifts is N which is at least three and each of the different phase shifts is one of the multiples of $m360°/N$ where m ranges from 1 to N, and the phase difference between adjacent phase shifting stripes is $360°/N$; and
   repeating the step of (a) on the same major surface of the light transmissive substrate to form additional phase shifting stripes which intersect the phase shifting stripes formed by the step (a) at right angles.

18. Apparatus for forming a Fourier transform hologram of an array of beams of electromagnetic radiation on a Fourier transform plane, comprising:
   a pseudo-random phase mask receptive in use of a beam of electromagnetic radiation and comprised of phase-shifting areas, there being an approximately equal number of phase shifting areas for each of the different phase shifts, wherein the number of different phase shifts is N which is at least three and each of the different phase shifts is one of the multiples of $m360°/N$, where m ranges from 1 to N, and the phase difference between orthogonally adjacent phase shifting areas is $360°/N$; and
   means for recording a hologram of the Fourier transform of said phase mask.

19. A pseudo-random phase mask for use in recording a Fourier transform hologram, comprising: a light transmissive substrate comprised of a plurality of phase shifting areas, there being an approximately equal number of phase-shifting areas for each of the different phase shifts, wherein the number of different phase shifts is N which is at least three and each of the different phase shifts is one of the multiples of $m360°/N$, where m ranges from 1 to N, and the phase difference between adjacent phase shifting areas is $360°/N$.

20. Apparatus for forming a hologram of an array of beams of electromagnetic radiation on a Fourier transform plane, comprising:
   a pseudo-random phase mask, receptive in use of a beam of electromagnetic radiation, comprising first and second arrays of phase shifting stripes which intersect at right angles to each other and each of which comprises an approximately equal number of phase shifting stripes for each of N different phase shifts of $m360°/N$ where m ranges from 1 to N and N is at least three, wherein each of said arrays comprises alternate stripes differing in phase by $360°/N$ and intermediate stripes each intermediate a corresponding pair of the alternate stripes and having a phase shift equal to the mean value of the phase shifts of the corresponding pair of alternate stripes, whereby a power spectrum of a phase-shifted beam of the electromagnetic radiation on the Fourier transform plane distributes in two orthogonal directions from a center maximum of the power spectrum; and
   means for recording a hologram of the Fourier transform of said beam at said center maximum.

21. Apparatus as claimed in claim 20, wherein said phase shifts include 0°, 60°, 120°, 180°, 240° and 300°.

22. A pseudo-random phase mask comprising, a first and a second light transmissive substrate overlapping each other and each comprised of an array of phase shifting stripes and relatively positioned so that the respective arrays of phase shifting stripes intersect at right angles to each other, wherein each of said arrays comprises an approximately equal number of phase shifting stripes for each of N different phase shifts of $m360°/N$ where $m$ ranges from 1 to N and N is at least three, and wherein each of said arrays comprises alternate stripes differing in phase by $360°/N$ and intermediate stripes each intermediate a corresponding pair of the alternate stripes and having a phase shift equal to the mean value of the phase shifts of the corresponding pair of alternate stripes.

23. A light diffuser for use in recording a Fourier transform hologram, comprising:

an aperture mask having rectangular apertures arranged in a pattern of rows and columns, and a pseudo-random phase mask comprised of an array of phase shifting areas having a one-to-one correspondence with the array of said rectangular apertures, said array of phase shifting areas having an approximately equal number of alternate phase shifting areas for each of N different phase shifts of $m360°/N$ where m ranges from 1 to N and N is at least three, wherein the alternate ones of the phase shifting areas differ in phase by $360°/N$, and intermediate phase shifting areas each intermediate a corresponding pair of the alternate phase shifting areas and having a phase shift equal to the mean value of the phase shifts of the corresponding pair of alternate phase shifting areas.

* * * * *